United States Patent
Friesen et al.

(10) Patent No.: US 10,718,109 B2
(45) Date of Patent: Jul. 21, 2020

(54) PREVENTING CORROSION IN A GREENHOUSE

(71) Applicants: Kenneth Kyle Friesen, Leamington (CA); John Friesen, Leamington (CA); Adam Suder, Leamington (CA)

(72) Inventors: Kenneth Kyle Friesen, Leamington (CA); John Friesen, Leamington (CA); Adam Suder, Leamington (CA)

( * ) Notice: Subject to any disclaimer, the term of this patent is extended or adjusted under 35 U.S.C. 154(b) by 345 days.

(21) Appl. No.: 15/178,640

(22) Filed: Jun. 10, 2016

(65) Prior Publication Data

US 2016/0298330 A1   Oct. 13, 2016

Related U.S. Application Data

(60) Provisional application No. 62/145,570, filed on Apr. 10, 2015.

(51) Int. Cl.
  *E04B 1/64*   (2006.01)
  *C23F 13/06*   (2006.01)
  *A01G 9/14*   (2006.01)

(52) U.S. Cl.
  CPC .............. *E04B 1/642* (2013.01); *C23F 13/06* (2013.01); *A01G 9/14* (2013.01)

(58) Field of Classification Search
  CPC ............ E04B 1/642; C23F 13/06; A01G 9/14
  USPC ........................................................ 52/173.1
  See application file for complete search history.

(56) References Cited

U.S. PATENT DOCUMENTS

| 2,480,087 | A | * | 8/1949 | Robinson | C23F 13/02 204/196.15 |
| 3,342,710 | A | * | 9/1967 | Nakamura | C23C 22/24 148/264 |
| 3,354,063 | A | * | 11/1967 | Shutt | F16L 58/00 204/196.3 |
| 3,441,491 | A | * | 4/1969 | George | C23F 13/06 204/196.15 |
| 3,500,596 | A | * | 3/1970 | Andersson | E04B 1/3483 52/275 |
| 4,189,658 | A | * | 2/1980 | Schleinkofer | H01J 35/10 378/125 |
| 4,496,444 | A | * | 1/1985 | Bagnulo | C23F 13/02 205/731 |
| 5,449,563 | A | * | 9/1995 | Zhang | C23F 13/10 228/262.44 |
| 8,484,929 | B1 | * | 7/2013 | Begdouri | E02D 29/045 52/745.03 |

(Continued)

FOREIGN PATENT DOCUMENTS

| CN | 204481142 U | * | 7/2015 | |
| DE | 19946581 C1 | * | 10/2001 | ............ E02D 27/18 |
| GB | 2400121 A | * | 10/2004 | ............ C25D 13/02 |

OTHER PUBLICATIONS https://www.growertalks.com/Article/?articleid=21380 (Year: 2015).*

(Continued)

*Primary Examiner* — Jeanette E Chapman
(74) *Attorney, Agent, or Firm* — Carlson, Gaskey & Olds, P.C.

(57) ABSTRACT

This disclosure relates to a greenhouse system. The greenhouse system includes a metallic structural element and an anode mounted on the metallic structural element. A method is also disclosed.

21 Claims, 2 Drawing Sheets

(56) References Cited

U.S. PATENT DOCUMENTS

| | | | | |
|---|---|---|---|---|
| 2012/0137882 A1* | 6/2012 | Chew | ................ | C02F 1/46109 |
| | | | | 95/149 |
| 2014/0021062 A1* | 1/2014 | Sergi | ...................... | C23F 13/14 |
| | | | | 205/730 |
| 2015/0223418 A1* | 8/2015 | Collins | ................ | A01G 31/02 |
| | | | | 47/62 R |

OTHER PUBLICATIONS

Corrosion Protection Plan(CPP)(Mar. 9, 2012) http://www.etc-web.com/corrosion-protection-plan/ (Year: 2012).*

English translation of DE 19946581 C1, Title: Foundation, for technological troughs provided with reinforcing elements and injection openings, publication date Oct. 11, 2001; inventor: Frohne Klaus (Year: 2001).*

\* cited by examiner

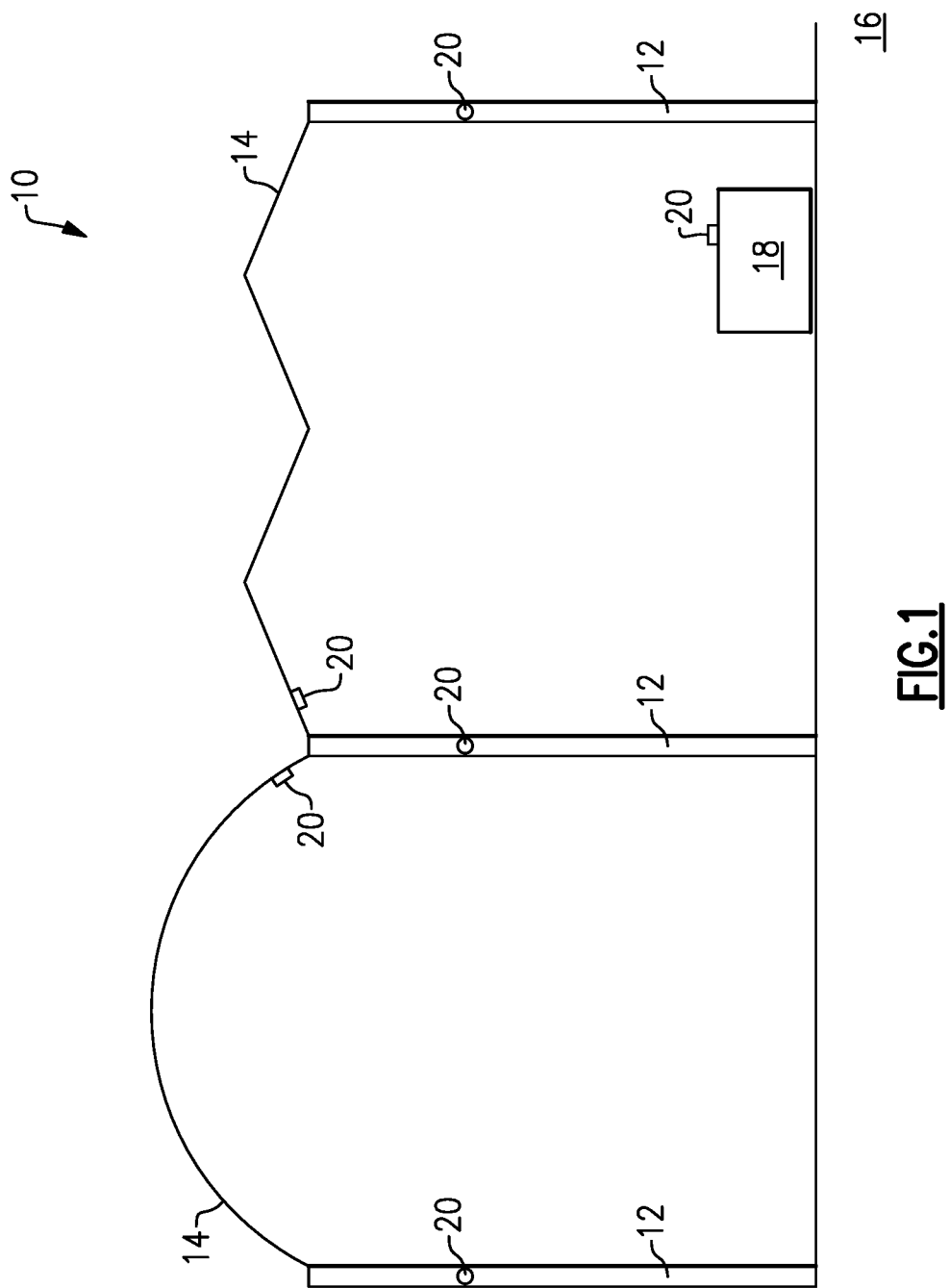

PREVENTING CORROSION IN A GREENHOUSE

CROSS REFERENCE TO RELATED APPLICATIONS

This application claims priority to U.S. Provisional Application No. 62/145,570 which was filed on Apr. 10, 2015.

BACKGROUND

This disclosure relates generally to preventing corrosion in a greenhouse. Corrosion is caused by chemical reactions when metals are exposed to certain environmental conditions. The environmental conditions that cause corrosion may include chemicals, substances with high or low pH balances, salt, or even water. Byproducts of corrosion in commonly used metallic construction materials may include rust and aluminum oxide. Once corrosion has begun on a metal surface, it often worsens and spreads rapidly. Corrosion is visually unappealing and deteriorates the structural integrity of the metal.

Many greenhouse structures are built using metallic materials, which can corrode and deteriorate over time. The relatively harsh environment within a greenhouse can accelerate the process of corrosion within the metal structure of a greenhouse. Known preventative measures for counteracting the naturally occurring corrosion processes include coating or treating the metal surfaces. Such coatings or treatments may include painting, powder coating, galvanizing, electro plating, and anodizing. However, these treatments are not always effective.

SUMMARY

A greenhouse system according to an exemplary aspect of the present disclosure includes a metallic structural element and an anode mounted on the metallic structural element.

A greenhouse system according to another exemplary aspect of the present disclosure includes a metallic structural element and an electrical component electrically isolated from the metallic structural element. An anode is mounted on at least one of the metallic structural element and the electrical component.

An exemplary method of controlling corrosion in a greenhouse includes mounting an anode on a metallic structural element of the greenhouse such that corrosion forms on the anode but not the metallic structural element.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 illustrates an example greenhouse system.

DETAILED DESCRIPTION

Figure 2A:
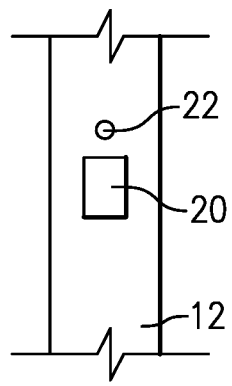
FIG. 2A illustrates a detail of an example greenhouse system.

FIG. 1 illustrates an example greenhouse system 10. The system 10 is formed from structural elements, such as an upright post 12 and roof element 14. In some examples, the system 10 includes a plurality of upright posts 12 and a plurality of roof elements 14. The system 10 may include additional structural elements, such as trusses and bracing. In the illustrated example, the upright post 12 protrudes from a ground level 16. At least one of the upright post 12 and the roof element 14 is metallic. In another embodiment, a plurality of the structural elements 12, 14 are metallic. In yet a further embodiment, all of the structural elements 12, 14 are metallic. The metallic structural elements 12, 14 may include a protective coating or treatment, such as painting, powder coating, galvanizing, electro plating, and anodizing. Although a particular greenhouse system 10 is illustrated, other configurations of greenhouses are also contemplated within the scope of this disclosure.

The greenhouse system 10 includes an electrical system or electrical component 18. In the illustrated embodiment, the electrical component 18 is schematically shown located at ground level 16. In some embodiments, the electrical component 18 may be mounted to an upright post 12 or roof element 14. In other embodiments, the electrical component 18 may be mounted to another structural element, such as a truss or bracing. The electrical component 18 may be one of a wire, electrical panel, electrical cabinet, controller, generator, actuator, motor, fuse, solar panel, and computer system. Other types of electrical components may also fall within the scope of this disclosure. In some embodiments, the system 10 includes a plurality of electrical components 18.

The electrical component 18 is electrically isolated from the upright post 12 and the roof element 14, such that current cannot flow between the electrical component 18 and the structural elements 12, 14. The electrical isolation prevents conductivity from the electrical component 18 into the upright post 12 or roof element 14. In embodiments where the electrical component 18 is mounted on an upright post 12, roof element 14 or other structural element, an electrically isolative barrier may be used to electrically isolate the electrical component 18.

At least one anode 20 is mounted on the greenhouse system 10. The anode 20 may be mounted on an upright post 12 or a roof element 14. In other embodiments, the anode 20 may be mounted on other structural elements, such as trusses or bracing. In an embodiment, the anode 20 includes zinc. Zinc is very high on the galvanic series chart, and thus will act as the anode when interacting with most other metals. In another embodiment, the anode 20 may include another material that is high on the galvanic series chart, such as magnesium or aluminum. In an embodiment, the anodes 20 may be mounted by a bolt or screw onto the upright post 12 or roof element 14. The anode 20 is a sacrificial anode, such that any corrosion attacking the system 10 will take place on the anode 20 instead of the upright post 12 or roof element 14. After an anode 20 has been corroded, it may be replaced with another anode 20 such that the new anode 20 continues to bear most of the corrosion.

In an embodiment, a plurality of anodes 20 are mounted throughout the greenhouse system 10. An anode 20 may also be mounted on the electrical component 18 to help prevent corrosion at the electrical component 18. Anodes 20 may be mounted near bolts, drilled holes, scratches or places where two different metals contact one another within the greenhouse system 10.

FIG. 2A shows a drilled hole 22 in an upright post 12. An anode 20 is mounted near the drilled hole 22.

Figure 2B:
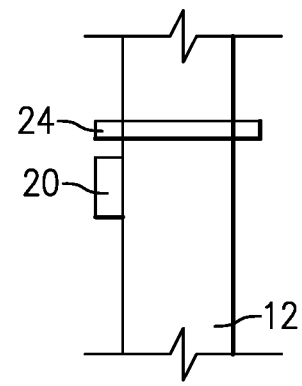
FIG. 2B illustrates a detail of an example greenhouse system.

FIG. 2B shows a bolt 24 in an upright post 12. An anode 20 is mounted near the bolt 24.

Figure 2C:
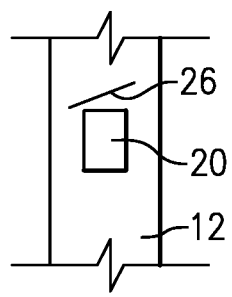
FIG. 2C illustrates a detail of an example greenhouse system.

FIG. 2C shows a scratch 26 on an upright post 12. The scratch 26 may be in the upright post 12 itself, or may be in a coating on the upright post 12. An anode 20 is mounted near the scratch 26.

Figure 2D:
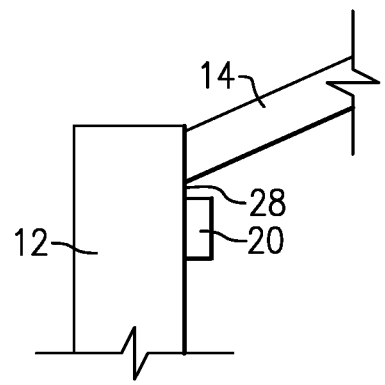
FIG. 2D illustrates a detail of an example greenhouse system.

FIG. 2D shows a point of contact 28 between two metallic structures. In the illustrated example, the point of contact 28 is between an upright post 12 and a roof element 14. In one embodiment, the upright post 12 and roof element 14 may be of different metallic materials. An anode 20 is mounted near the point of contact 28.

Although the drilled hole 22, bolt 24, scratch 26 are illustrated on an upright post 12, these may also be located on a roof element 14 or the electrical component 18. These are areas where corrosion occurs more rapidly, and thus would benefit from a sacrificial anode 20. Corrosion also occurs much more rapidly at places where there is an imperfection in a coating. Thus, any places on the upright posts 12 or roof elements 14 where there is an imperfection would also be a suitable location for a sacrificial anode 20.

Mounting anodes 20 throughout the greenhouse system 10 to bear the burden of corrosion maintains structural integrity of the upright posts 12 and roof elements 14 and lengthens the lifetime of the system 10. Isolating the electrical component 18 also helps to prevent corrosion. During the chemical reaction of corrosion, electricity is produced and transferred within the metals, which can accelerate the corrosion process. Isolating the electrical component 18 helps prevent corrosion by not allowing any electrical current to flow from the electrical component 18 to the metallic components of the system 10. This also prevents electrons produced in the metallic components during the chemical reaction of corrosion from flowing to the electrical component 18. Isolating the electrical component 18 may also prevent damage within the greenhouse system in case of a lightning strike.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A greenhouse system, comprising:
    a greenhouse structure including a metallic structural element; and
    an anode mechanically mounted on the metallic structural element.

2. The greenhouse system as recited in claim 1, wherein the anode is a sacrificial anode and includes zinc.

3. The greenhouse system as recited in claim 1, wherein the metallic structural element is an upright post.

4. The greenhouse system as recited in claim 1, wherein the metallic structural element is a roof element.

5. The greenhouse system as recited in claim 1, comprising an electrical component.

6. The greenhouse system as recited in claim 5, wherein the electrical component is electrically isolated from the metallic structural element.

7. The greenhouse system as recited in claim 5, wherein the electrical component is one of a wire, electrical panel, electrical cabinet, controller, generator, actuator, motor, fuse, solar panel, and computer system.

8. The greenhouse system as recited in claim 1, wherein the anode is mounted near at least one of a bolt, a drilled hole, and a scratch on the metallic structural element.

9. The greenhouse system as recited in claim 1, comprising a plurality of metallic structural elements and a plurality of anodes mounted on the plurality of metallic structural elements.

10. A greenhouse system, comprising:
    a greenhouse structure including a metallic structural element;
    an electrical component electrically isolated from the metallic structural element; and
    an anode mechanically mounted on at least one of the metallic structural element and the electrical component.

11. The system as recited in claim 10, wherein the anode includes zinc.

12. The system as recited in claim 10, wherein the anode is mounted near at least one of a bolt, a drilled hole, and a scratch on the metallic structural element.

13. The system as recited in claim 10, wherein the metallic structural element is one of an upright post and a roof element.

14. A method of controlling corrosion in a greenhouse, comprising:
    electrically isolating an electrical component from a metallic structural element of the greenhouse; and
    mounting an anode on the metallic structural element of the greenhouse such that corrosion forms on the anode but not the metallic structural element.

15. The method as recited in claim 14, wherein the anode includes zinc.

16. The method as recited in claim 14, comprising mounting the anode near at least one of a bolt, a drilled hole, and a scratch on the metallic structural element.

17. The method as recited in claim 14, wherein the metallic structural element is an upright post.

18. The method as recited in claim 14, wherein the metallic structural element is a roof element.

19. The method as recited in claim 14, comprising mounting a plurality of anodes on a plurality of metallic structural elements.

20. The greenhouse system as recited in claim 1, wherein the metallic structural element has a protective coating.

21. The greenhouse system as recited in claim 1, wherein the anode is mounted to the structural element by a bolt or screw.

* * * * *